(12) United States Patent
Monical et al.

(10) Patent No.: US 9,299,241 B1
(45) Date of Patent: Mar. 29, 2016

(54) ENHANCED ALERT MESSAGING

(75) Inventors: George Ernest Monical, Park Ridge, IL (US); Yuval Saban, Oak Park, IL (US)

(73) Assignee: Allstate Insurance Company, Northbrook, IL (US)

( * ) Notice: Subject to any disclaimer, the term of this patent is extended or adjusted under 35 U.S.C. 154(b) by 654 days.

(21) Appl. No.: 13/367,806

(22) Filed: Feb. 7, 2012

Related U.S. Application Data

(60) Provisional application No. 61/440,147, filed on Feb. 7, 2011.

(51) Int. Cl.
*G08B 23/00* (2006.01)
*G01W 1/00* (2006.01)
*G08B 21/00* (2006.01)
*G08G 1/09* (2006.01)
*G06Q 40/02* (2012.01)
*G06Q 30/00* (2012.01)
*G06F 17/30* (2006.01)

(52) U.S. Cl.
CPC ....................................... *G08B 23/00* (2013.01)

(58) Field of Classification Search
CPC ......... G06F 15/173; G06F 17/30; G06F 3/00; G08B 21/00; G08B 23/00; G06Q 10/00
USPC ......................................................... 340/504
See application file for complete search history.

(56) References Cited

U.S. PATENT DOCUMENTS

| | | | |
|---|---|---|---|
| 7,312,712 B1 * | 12/2007 | Worrall | 340/573.4 |
| 7,529,683 B2 * | 5/2009 | Horvitz et al. | 705/1.1 |
| 7,844,604 B2 * | 11/2010 | Baio et al. | 707/732 |
| 8,519,860 B2 * | 8/2013 | Johnson et al. | 340/686.1 |
| 8,751,636 B2 * | 6/2014 | Tseng et al. | 709/224 |
| 2006/0015254 A1 * | 1/2006 | Smith | 702/3 |
| 2011/0161119 A1 * | 6/2011 | Collins | 705/4 |

* cited by examiner

*Primary Examiner* — Jennifer Mehmood
*Assistant Examiner* — John Mortell
(74) *Attorney, Agent, or Firm* — Banner & Witcoff, Ltd.

(57) ABSTRACT

An enhanced alerts server may receive alert-related and user-related information from various sources. The server may then generate various types of alerts, including alerts related to weather, crime, product recalls, etc. The server may then apply various predefined rules for associating different types of alerts with a given end user. In deciding on which alerts are transmitted to which users, the enhanced alerts server may also consider any feedback provided by the users regarding previously delivered alerts. An additional aspect of the implementation relates to an easy-to-understand, color-coded display associated with a device through which users may access received alerts.

20 Claims, 6 Drawing Sheets

ENHANCED ALERT MESSAGING

CROSS-REFERENCE TO RELATED APPLICATIONS

The present application claims priority to U.S. Provisional Application No. 61/440,147, filed Feb. 7, 2011, and entitled "Enhanced Alert Messaging," the entire disclosure of which is hereby incorporated by reference in its entirety.

TECHNICAL FIELD

Aspects of the disclosure generally relate to an enhanced alerts platform through which personalized messages may be sent to various entities. In particular, aspects of the disclosure allow for the messages to be personalized based on various factors, including information already known about the entities and feedback received from the entities.

BACKGROUND

Individuals may desire to be alerted for a variety of reasons in their everyday lives. Some alerts may notify individuals of emergencies while other types of alerts may be less time sensitive. For instance, airlines often alert passengers of flight delays, ticket confirmations, and other status updates via email or telephone messages. Weather services provide alerts regarding weather systems such as rain showers, hurricanes, tornadoes, and snow storms via the television, telephone, and the internet.

However, conventional alert systems are narrowly focused for specific alerting purposes and/or modalities. An alerting system operated by an airline generally only transmits messages regarding flight information whereas a weather alerting system only reports weather-related disturbances. Given that alerts may originate from different alerting systems each possessing their own alerting protocol, individuals may be overwhelmed when attempting to determine which alerts are of interest, or highly relevant. Individuals may receive unwanted alerts from various sources potentially causing the user to overlook an alert of interest, highly relevant, or urgent to the individual, thereby increasing the levels of user frustration, and potentially preventing an individual from an opportunity to avert, or take mitigation action that is based on an alert.

Thus, current alerting techniques are not satisfactory.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address at least the issues mentioned above by disclosing methods, computer readable media, and apparatuses for alerting individuals, groups, organizations, and other entities for various purposes. An enhanced alerts server may transmit personalized messages to user terminals based on a user profile.

With another aspect of the disclosure, entities may provide feedback to the alerts server in order for the system to further target appropriate alerts to the entities.

Aspects of the disclosure may be provided in at least one computer-readable medium having computer-executable instructions that, when executed by at least one processor, cause a computer, user terminal, or other apparatus to at least perform one or more of the processes described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, current techniques for transmitting alert messages are limited. In accordance with various aspects of the disclosure, methods, computer-readable media, and apparatuses are disclosed in which personalized alerts may be transmitted to various entities via an enhanced alerts server. In certain aspects, the enhanced alerts server may be an online system and/or mobile device application for customers of an organization that may deliver safety information so that the customers are able to avoid danger and keep their family, home, and vehicles protected. As the organization may already offer products/services to the end users of the enhanced alerts server, the organization may be able to use information about the end users stored in the organization's databases to personalize the messages and infer what the user's alert preferences may be. The organization may also partner with other organizations (e.g., credit bureaus, government offices, etc.) to supplement any knowledge about end users. Further still, the users themselves may provide feedback to the enhanced alerts server regarding their preferences for different types of alerts. This feedback may be used by the enhanced alerts server in providing follow-on alerts.

Figure 1:
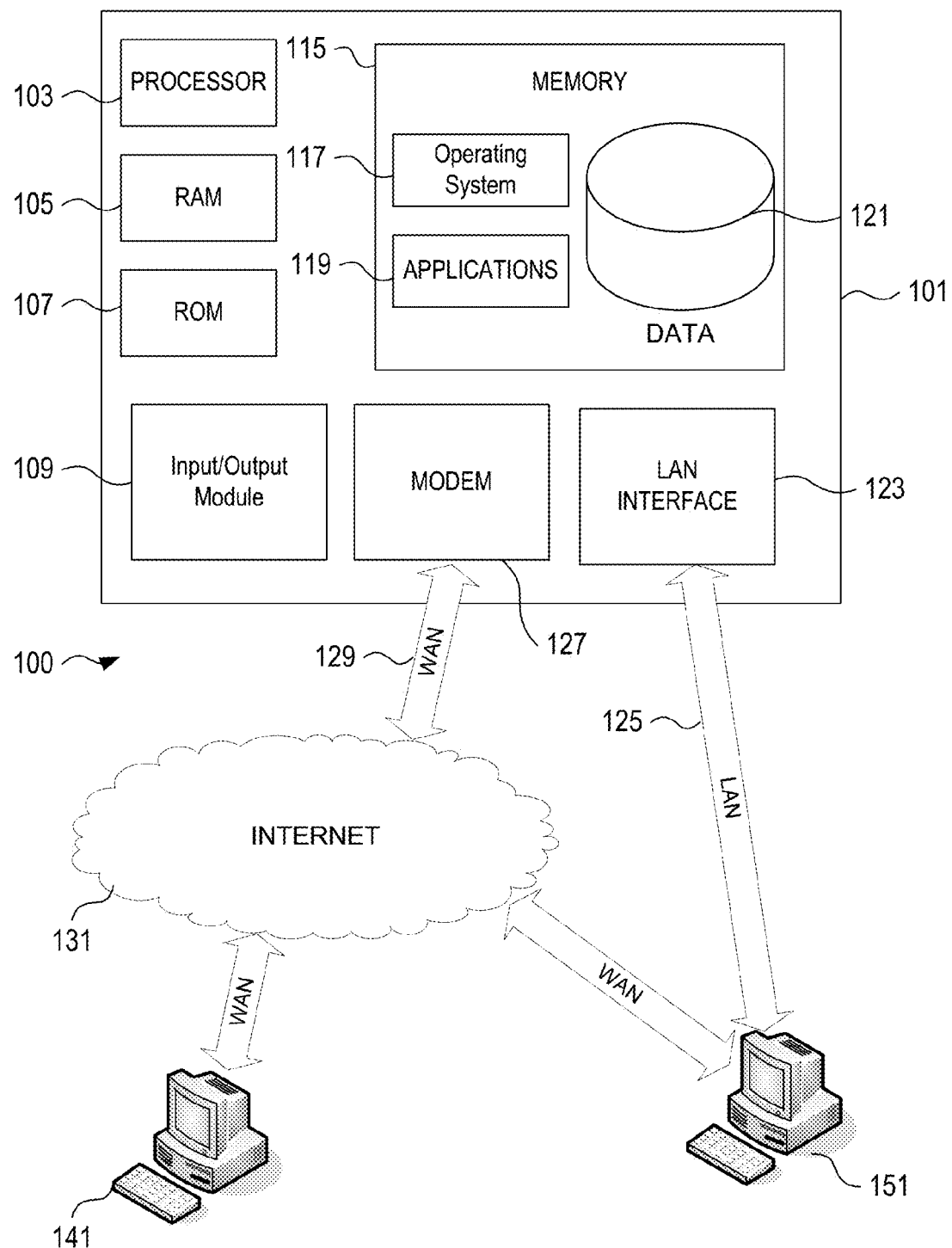
FIG. 1 shows an illustrative operating environment in which various aspects of the disclosure may be implemented.

FIG. 1 illustrates a block diagram of an enhanced alerts server 101 (e.g., a computer server) in communication system 100 that may be used according to an illustrative embodiment of the disclosure. The server 101 may have a processor 103 for controlling overall operation of the enhanced alerts server 101 and its associated components, including RAM 105, ROM 107, input/output module 109, and memory 115.

I/O 109 may include a microphone, keypad, touch screen, and/or stylus through which a user of enhanced alerts server 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to determine if a given alert should be transmitted to a user. In addition, processor 103 may assign different priorities to the alerts based on feedback received from a user.

The server 101 may operate in a networked environment supporting connections to one or more remote computers, such as terminals 141 and 151. The terminals 141 and 151 may be personal computers or servers that include many or all of the elements described above relative to the computing device 101. Also, terminal 141 and/or 151 may be data stores for storing information related to various users of enhanced alerts server 101. The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced alerts server 101 according to an illustrative embodiment of the disclosure may include computer executable instructions for invoking functionality related to transmitting appropriate alerts messages to various end users.

Enhanced alerts server 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, smart phones, server computers, handheld or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer readable storage media including non-transitory memory storage devices, such as a hard disk, random access memory (RAM), and read only memory (ROM).

Figure 2:
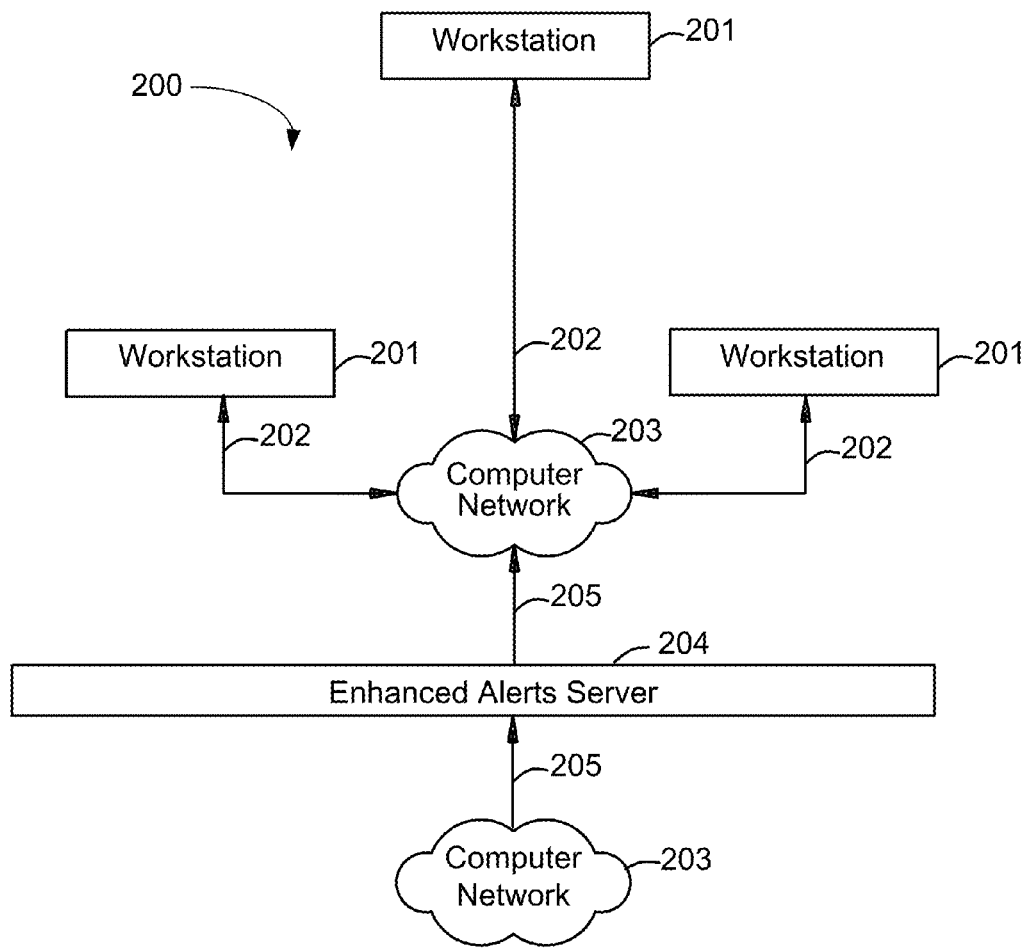
FIG. 2 shows a first block diagram of workstations and servers that may be used to implement the processes and functions of certain aspects of the present disclosure.

Referring to FIG. 2, a first system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to enhanced alerts server 204. In certain embodiments, workstations 201 may run different algorithms used by server 204 for transmitting a particular alert to an end user, or, in other embodiments, workstations 201 may be different points at which the enhanced alerts server 204 may be accessed by end users. In system 200, enhanced alerts server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
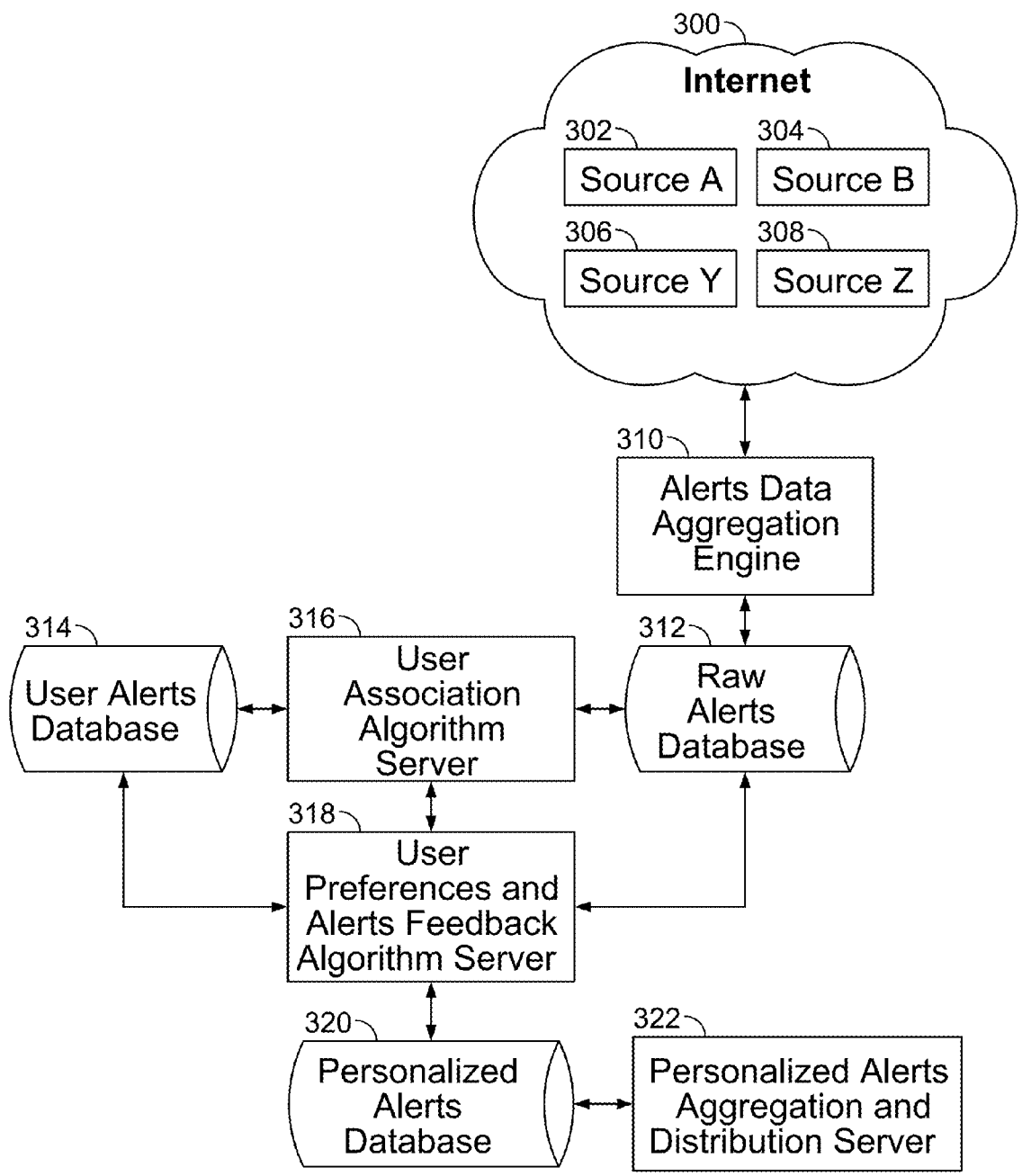
FIG. 3 shows a second block diagram of workstations and servers that may be used to implement the processes and functions of certain aspects of the present disclosure.

FIG. 3 shows a second block diagram of workstations and servers that may be used to implement the processes and functions of certain aspects of the present disclosure. In FIG. 3, various data sources 302-308 may provide data to an alerts data aggregation engine 310 via internet 300. Sources of data may include traffic reports, crime statistics, weather data, product recall data, social network data, etc. from organizations that maintain this information. The alerts data aggregation engine 310 may aggregate all data from various sources 302-308 wherein the aggregated alerts data can have an impact and/or be of interest to users of enhanced alerts server 204 or 101. Data aggregated from the data aggregation engine 310 may be stored in a raw alerts database 312. Meanwhile, data about various users that may already be possessed by an organization managing enhanced alerts server 204 may be stored in user alerts database 314. Information from databases 312 and 314 may be transmitted to a user association algorithm server 316. Server 316 may apply a predefined algorithm to decide on which alerts any given user may receive. The algorithm may classify the data into an alert category, an alert type (or the alert data may already include the classification information), and an alert severity and/or urgency. The algorithm may identify users who have indicated they want alerts in those categories (e.g., based on a user profile). The algorithm may also filter the identified returned users by home address based or mobile based geographic location and/or by previous feedback. From there, the algorithm may determine a preferred mode of communication for sending the alert to the end user. Alerts may be further personalized and refined by applying the algorithm in user preference and alerts feedback algorithm server 318. Server 318 may apply an algorithm that takes into account user feedback as to previously transmitted alerts and/or alert preferences, including feedback on whether particular alerts were helpful/unhelpful, and/or which alerts were irrelevant, etc.

After applying algorithms that are a part of server 316 and 318, the resultant alerts data may be stored in personalized alerts database 320. Personalized alerts aggregation and distribution server 322 may receive alerts from database 320 for aggregation and distribution to the appropriate end users. Personalized alerts aggregation and distribution server 322 may periodically send status updates on all user specified alert categories to update the color of their displays. The alert may also include data to update all of the other categories of interest.

It should be noted that the various databases, engines, and modules depicted in FIG. 3 may each individually possesses all or some of the components of enhanced alerts server 101.

The processes described herein may be implemented by one or more of the components in FIGS. 1, 2, 3 and/or other components, including other computing devices.

Figure 4:
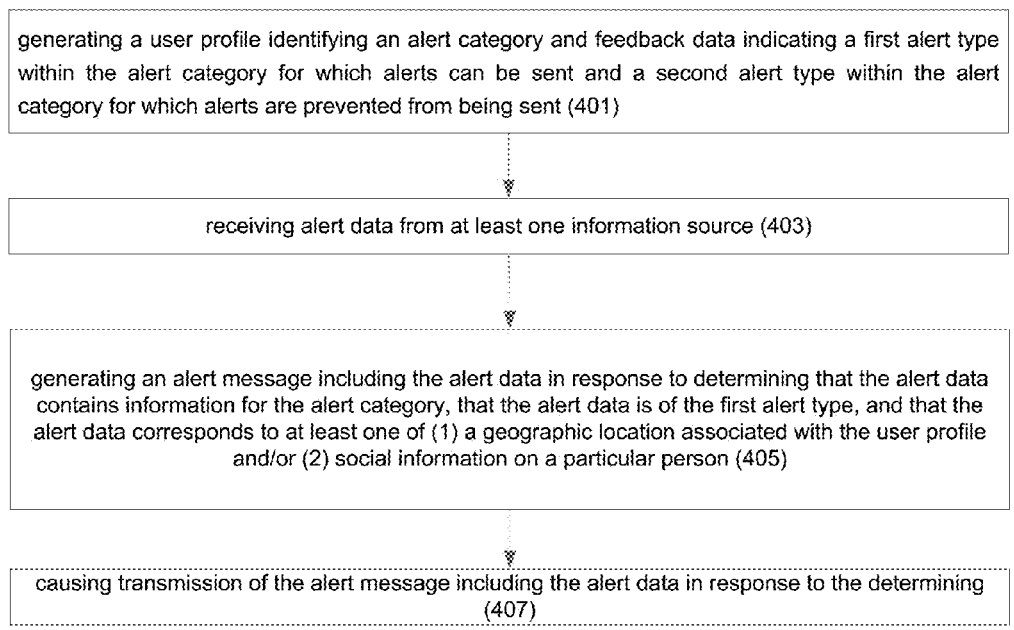
FIG. 4 shows a flow diagram of an alerting process in accordance with at least one aspect of the present disclosure.

FIG. 4 shows a flow diagram of an alerting process in accordance with at least one aspect of the present disclosure. The alerting process may be implemented and performed by a single computer, multiple computers, or other apparatus or system. Also, the alerting process may be stored as computer executable instructions on at least one computer readable medium. Each step in the process may be repeated one or more times, and the entire alerting process shown in FIG. 4 may be repeated one or more times. Some of the steps may be omitted, and additional steps may be added to the alerting process. The process may start out at step 401 where the enhanced alerts server 101 may generate a user profile identifying an alert category (e.g., owns a car, lives in Chicago, has a teenager on FACEBOOK®, etc.) and feedback data indicating a first alert type within the alert category for which alerts can be sent and a second alert type within the alert category for which alerts are prevented from being sent. For instance, a user may wish to receive weather-related alerts but may not wish to receive other types of alerts. The process may then move to step 403 where the enhanced alerts server 101 may receive alert data from at least one information source, such as sources 302-308 in FIG. 3. Next, the process may move to step 405 where the enhanced alerts server 101 may generate an alert message including the alert data in response to determining that the alert data contains information for the alert category, that the alert data is of the first alert type, and that the alert data corresponds to at least one of (1) a geographic location associated with the user profile (e.g., crime near home, storm approaching home, user mobile phone current geographic location identified as being in a high risk area (crime, weather) etc.) and/or (2) social information on a particular person (e.g., child). Finally, the process may move to step 407 where the enhanced alerts server 101 may cause transmission of the alert message including the alert data in response to the determination made in step 405.

The enhanced alerts server 101 may bundle important information from news outlets, law enforcement agencies (e.g., amber alerts, crime alerts, terror threat levels, etc.), the National Weather Service, commercial entities, and national recall organizations and deliver the information to a user device (e.g., computer, mobile phone, personal digital assistant (PDA), etc.) The alerts server 101 may thus allow users to receive timely weather, traffic, crime, and recall alerts.

In some aspects, users may set preferences for the categories of information that they wish to receive. For each category selected, users may also choose to receive alerts via various communication modalities, including email and/or text messaging. Alert messages may be related to various topics, including severe weather warnings, neighborhood crime, tips about the most dangerous intersections near a given user, and newsworthy product recalls. A user may also choose preferences for how much or how little of the information should be transmitted within a given category.

In certain aspects, the alert messages may help users live safely and empower them to be safe. The tone of the messages may be one of caring and empathy in some instances. In addition, the alert messages provide the recipient with information on how to protect him or herself. The alert messages may empower users to quickly connect with family, associates, or other resources, and avoid unnecessary risk exposure.

In certain aspects, alerts transmitted by the enhanced alerts server 101 may range from public, social, and educational alerts to alerts that are personal and urgent. Personal and urgent alerts may contain personal and/or confidential information which may cause a user to engage with a third party (generally outside of personal contacts). Examples of these types of alerts include those related to product recalls, credit rating declines, identity theft incidents, and information related to insurance claims. Social alerts may contain socially interesting information that users may not care to share with their family and/or their social network. Examples of social alerts include newsletters featuring information about all services and alerts, information on crime and traffic, weather-related data, and/or information on social networking incidents and/or teen driving incidents. Using the same examples, educational alerts may include information on product recalls, credit rating declines, newsletters featuring information about all services and alerts, and information on crime and traffic. Similarly, urgent alerts may contain more time-sensitive information and may include information on identity theft incidents, information related to insurance claims, weather-related data, and/or information on social networking incidents and/or teen driving incidents.

Each of the alerts may be offered free of charge or for a fee. In other aspects, the alerts may be provided free of charge initially and may be offered for a fee after some time if the alerts are viewed favorably by an end user (e.g., "freemium" content). In some aspects, the more urgent and/or personalized alerts may be offered for a fee while other alerts may be offered free of charge.

In yet other aspects, some of the alerts provided by the enhanced alerts server 101 may be sponsored by a third party (e.g., a company, organization, etc.). The third party may have an interest in promoting the alert. As an example, an auto body and repair shop may be interested in promoting alerts that deal with weather that may damage automobiles and therefore may pay the entity (e.g., organization, group, individual, etc.) managing the enhanced alerts server 101 part or all of the fees associated with transmitting the alert. In addition, a retail store may be interested in sponsoring alerts related to coupons, sales, etc. at their location. In other aspects, the entity managing the enhanced alerts server 101 may initiate a bidding process for allowing a third-party entity to sponsor a given alert. In yet other embodiments, the entity managing the enhanced alerts server 101 (e.g., an insurance company) may sponsor an alert to help reduce the number and value of claims associated with the information in the alert. For example, for a weather-related alert that may damage property, an insurance company may be willing to sponsor the alert to reduce the amount and number of claims that may result from any inclement weather. Ultimately, when commercial entities are sponsoring a particular alert, the content of the alert may strike a balance between an empathetic message and the commercial drivers for sponsorship (e.g., advertising reach, sponsorship cost, added revenue potential, etc.)

In other aspects, if an insurance company is managing the enhanced alerts server 101, the insurance company may offer discounts for insurance premiums to users that subscribe to the alerts service. In some instances, the insurance company may offer discounts on insurance premiums if user of the enhanced alerts server 101 takes some sort of risk-mitigating action as a result of receiving the alert message. For instance, if the user moves a car associated with a weather-related alert from an unprotected area to a protected area, the insurance company may offer a discount to the user on an automobile insurance policy that the user may possess with the insurance company for taking this concrete risk-mitigating action. Further, the insurance company may automatically verify that the user has completed the risk-reducing action through electronic devices, such as via telematics devices useful for communicating data from one location to another. For example, a user's car may be associated with a GPS device that communicates geographic location data and a time stamp to the enhanced alerts server 101 informing that the user's car was moved from an outdoor parking lot to the user's garage after receiving the alert and before a hail storm.

Alerts may also be offered through various communication methodologies, including email, internet, voice, text, and/or mobile applications.

Each type of alert may also be useful to users for different reasons. For instance, if an organization such as an insurance company is offering the alert service, information about product recalls may help the insurance company reduce the number and amount of claims related to the recall. Also, information about identity thefts and insurance claims may also be provided at a fee, which would allow the organization offering these alerts to benefit from an additional revenue stream. Further, newsletters with information about all services and alerts provided by the enhanced alerts server 101, including local statistics on crime and traffic, may ensure that a user has the opportunity to continually update preferences and register their feedback. Finally, information relevant to a community such as local weather incidents, social networking incidents, and/or poor teen driving incidents, may allow users to engage family members and/or their social network easily and quickly.

As an example of how social networking incidents may be transmitted to an end user, consider a scenario in which a child of a user of the enhanced alerts server 101 is a member of various social networking websites. If the child becomes friends with a suspicious person (e.g., a person outside of the child's age group, a person that does not share any mutual friends with the child, etc.) through a social networking website, the raw alerts database (FIG. 3, 312) may be populated with details of the incident. Then based on preferences and past feedback the parent may receive an alert of the situation with a level of priority relevant for that parent. Also, the enhanced alerts server 101 may monitor public dialogues such as those on social networking sites to determine whether the child is being harassed or in some other type of danger. In this situation, an alert with the proper severity and/or anticipated accuracy may be sent to the parent. To assess the severity, the enhanced alerts server 101 may monitor for certain types of inappropriate language (e.g., violent, harassing, etc.) and acronyms addressed to and/or used by the monitored user (e.g., child, relative, friend). Certain words may suggest violence, physical or emotional harassment, or sexual activity may be assessed as the most severe to trigger sending of an alert. Other keywords may be deemed less harmful and may trigger alerts based on user preferences.

In other aspects of the disclosure, the enhanced alerts server 101 may include an application programming interface (API) to an organization that monitors content provided through a social networking site.

This implementation may be provided by a single organization or may be the result of a partnership among several different organizations. If multiple organizations are involved, one of the organizations may manage the enhanced alerts server 101 and coordinate how each type of alert is transmitted to users. For instance, in some embodiments a different organization may transmit each type (e.g., weather-related, crime-related, SMS, email, etc.) of alert. In other embodiments, a single organization may transmit all types of alerts whereas in yet other embodiments, the organization managing the enhanced alerts server 101 may also transmit the alerts to end users. In each case, the organization managing the enhanced alerts server 101 may retain final editorial and approval control over any alert sent through the enhanced alerts server 101.

As stated earlier, this implementation may empower the user to control preferences and allow them to give feedback on each message. By allowing users to give feedback, this platform may continually be optimized at delivering targeted alert messages around users' preferences. The enhanced alerts server 101 may personalize and target messages across both the content of the message and the delivery channel (e.g., email, text voicemail, etc.). The messages may have a tone of empathy and may protect the user's identity.

Examples of specific messages that may be transmitted via the enhanced alerts server 101 include: "protect yourself by leaving your lights on and ensure that your doors are locked, at this time of year there has been more crime in your area," "please double check your sump pump, there is a storm coming through and your area is expecting 5 inches of rain today," "talk to your local car dealer about a product recall; it looks like your car is affected," "text where you are going and get the best driving directions and find the best way to avoid traffic," "your child has friended a 37 year old male who has no mutual friends with any of your child's friends on a social networking website," "your credit score looks like it has dropped, could you have an identity theft problem?" and "talk with your kids about their driving; according to our records, your kids have sustained speeds of over 80 miles per hour for 50 minutes on Tuesday at 7 pm." One of ordinary skill in the art would recognize that these alerts are purely exemplary and may be varied to convey alternative and/or similar alerts.

Figure 5:
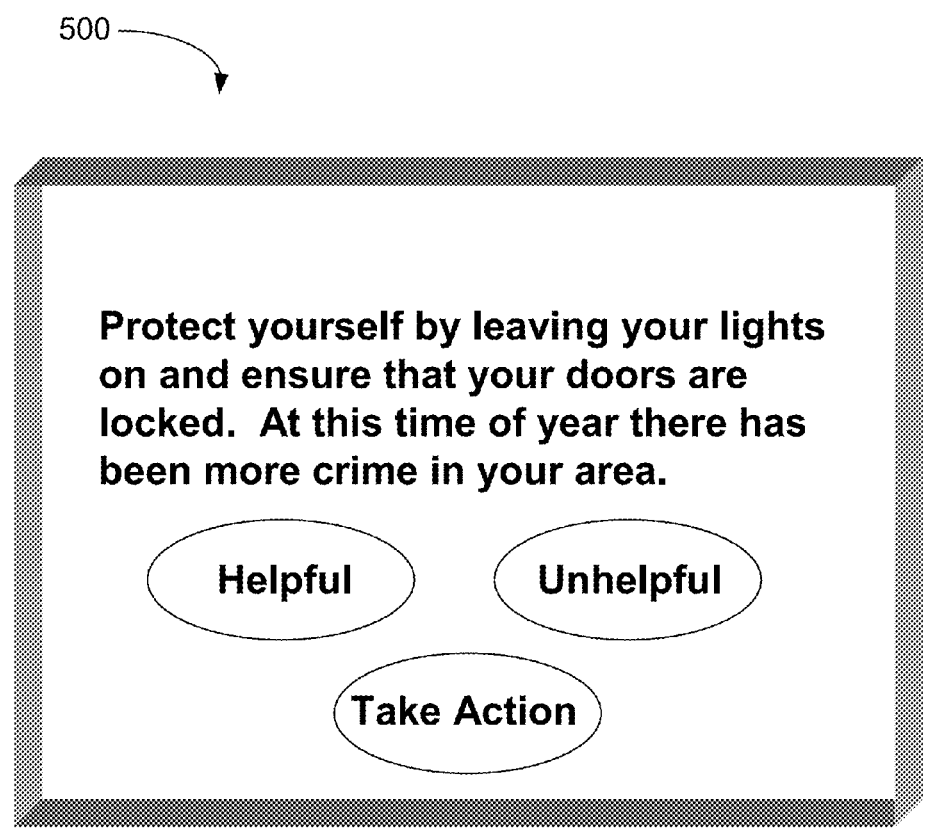
FIG. 5 shows an example alert message on a display screen of a user device in accordance with at least one aspect of the present disclosure.

FIG. 5 shows an example alert message on a display screen 500 of a user device in accordance with at least one aspect of the present disclosure. In each case, as shown in FIG. 5, an end user may score each alert or alert type as helpful and/or unhelpful and may then take an appropriate action. In response to this feedback, the enhanced alerts server 101 may modify the priority and/or communication modality of the alert and/or discontinue future alerts under the same and/or similar category. Scoring may be on a scale of 1 to 10 where 1 is least helpful and 10 is most helpful. Other metrics for scores may also be used. Examples of actions that may be taken include making contact with a family member, social network friends (e.g., friends on FACEBOOK®), or others. For instance, users may set up a list for contacting others associated with a particular alert (e.g., in order to initiate a conference call). In addition, the action may include contacting an employer (e.g., to determine whether the user should be coming into work as a result of a weather delay, etc.), an employee (e.g., to convey that the offices are closed due to a weather system, etc.), and/or remote electronic devices (e.g., appliances within a home to cause heat, air conditioning, etc. to turn on/off). The actions that are taken may be based on a recommendation from enhanced alerts server 101 that accompanies the alert and/or based on user preferences.

The enhanced alerts server 101 may consider various inputs prior to transmitting an alert message, including an alert type (e.g., weather-related, crime related, product recall-related, etc.), an alert subtype (e.g., a rain, snow, or hail-related subtype within the weather category), a communication protocol used to transmit the alert (e.g., voice, text, email, mobile application-based, etc.), an alert severity, and/or an anticipated alert accuracy. The alert severity may relate to how time-sensitive and/or important the alert may be to an end user whereas an alert accuracy may relate to how relevant the alert may be to the end user. Both the alert severity and the alert accuracy may be computed by a processor associated with the enhanced alerts server 101 based on predefined rules. Some of the rules may take into account any feedback received directly from a user. For instance, the enhanced alerts server 101 may designate a low severity and/or anticipated alert accuracy for a weather-related alert being sent to a user that has previously rated such alerts to be of low importance. In another embodiment, enhanced alerts server 101 may designate an alert with severity level to a specific user that is based on historical data and social knowledge and/or other data that is available and known to the server 101 about the specific user. In one embodiment the enhanced alerts server 101 may override the feedback delivered by the user in earlier communication in an effort to deliver an objective and extremely urgent alert to the user. In other aspects, the enhanced alerts server 101 may choose a different communication protocol (e.g., email versus SMS) based on user feedback on a particular alert or alert type. In this way, the enhanced alerts server 101 personalizes the communication channel, attaches the severity associated with the alert, and further prioritizes the order of the alert within the severity.

In certain aspects, the alert severity may be determined by enhanced alerts server 101 through a scoring system that may rate alerts based on how severe the alert may be. For instance, the system may set thresholds for each category, where alert data that scores 7 or higher on a scale of 1-10 is severe ("red"), 4-6 is of moderate severity ("yellow"), and 1-3 is low severity ("green"). User feedback may be used to adjust the thresholds for each category. The alert accuracy may relate to how useful/relevant the alert may be to a given end user. An initial anticipated alert accuracy may be set by enhanced alerts server 101 and may also be modified based on feedback provided by the user.

In deciding whether to send a given alert to a particular end user and in deciding the characteristics of any transmitted alert (e.g., communication modality, alert severity, alert priority, anticipated accuracy etc.), the enhanced alerts server 101 may take into account all information that is known about the end user and/or about users who are similar to the end user (e.g., by being part of the user's social network, by being of similar age, gender, etc.). In certain aspects, alert-related recommendations may be provided for similarly situated people (e.g., other parents with teenage daughters in your area monitored these social networking sites, etc.) In addition to considering the above-mentioned inputs regarding the characteristics of the alert, the enhanced alerts server 101 may also consider the identity of the recipient, any user selected alert preferences, the nature of the user's previous interactions with the enhanced alerts server, and any other user information that may be relevant. User selected preferences may include categories/types/subtypes of alerts and the communication modality selected by the user. The nature of the user's previous interactions with the enhanced alerts server 101 evaluated include whether the user has indicated similar alerts to be helpful and/or unhelpful and the rate at which the user has opened similar alerts (e.g., email messages). As an example, an alert category may be weather, an alert type within the weather category may be precipitation, and an alert subtype within the precipitation type may be snow. As mentioned before, the enhanced alerts server 101 may also consider information about the user, either directly from products/services offered to the user or from third party sources. Information that may be used in deciding whether to transmit a given alert and in deciding other associated characteristics include the vehicle identification number (VIN) of any vehicles owned by the user, the home/office address of the user, email, current location (e.g., based on the geocode of a handset or other user device, media access control (MAC) address, etc.), emergency contact list associated with the user, and/or an agent/call center previously used by the user.

Once the enhanced alerts server 101 chooses a particular communication protocol for delivering an alert, the server 101 may assign the alert a severity/priority that may determine the order that the alert is presented to the user. Various schemes may be chosen for assigning a severity/priority to a given alert message, including avatar type of graphical representation, a color scheme such as red, yellow, and/or green, and optional blinking of the aforementioned avatars or color schemes that can further be configured to blink at different rates and frequencies. In this example, an alert with a red color designation may have high severity/priority, an alert with a yellow color designation may have medium severity/priority, and an alert with a green color designation may have low severity/priority. Here, the server 101 may receive alert data specifying a severity, and server 101 may adjust the severity based on feedback data. For instance, tornadoes in the area of a given user may be assigned a red severity, rain showers may be assigned a yellow severity, and sunshine may be given a green severity. In this instance, user feedback, such as information related to living in low-lying areas, may adjust rain showers to a red severity. One of ordinary skill in the art would recognize that this example is one of many possible priority/severity designation schemes (e.g., numbers, stars, etc.) that may be used with the enhanced alerts server. If colors are used to designate the anticipated accuracy/relevancy of the alert and/or the severity of the alert, the colors may be presented in an easy-to-understand manner on a display associated with a user device. For instance, the user may be able to look at the display and immediately discern whether any urgent alerts have been transmitted by the enhanced alerts server based on the colors presented on the display screen. If the user wishes to find out more information about one of the colors displayed, the user may select the color and be transferred to another display screen with further information, such as information on specific burglaries in a neighborhood, local weather systems, etc. In other aspects, an initial severity associated with an alert may be set by the source of the information in the alert and later modified by the enhanced alerts server 101.

Figure 6:
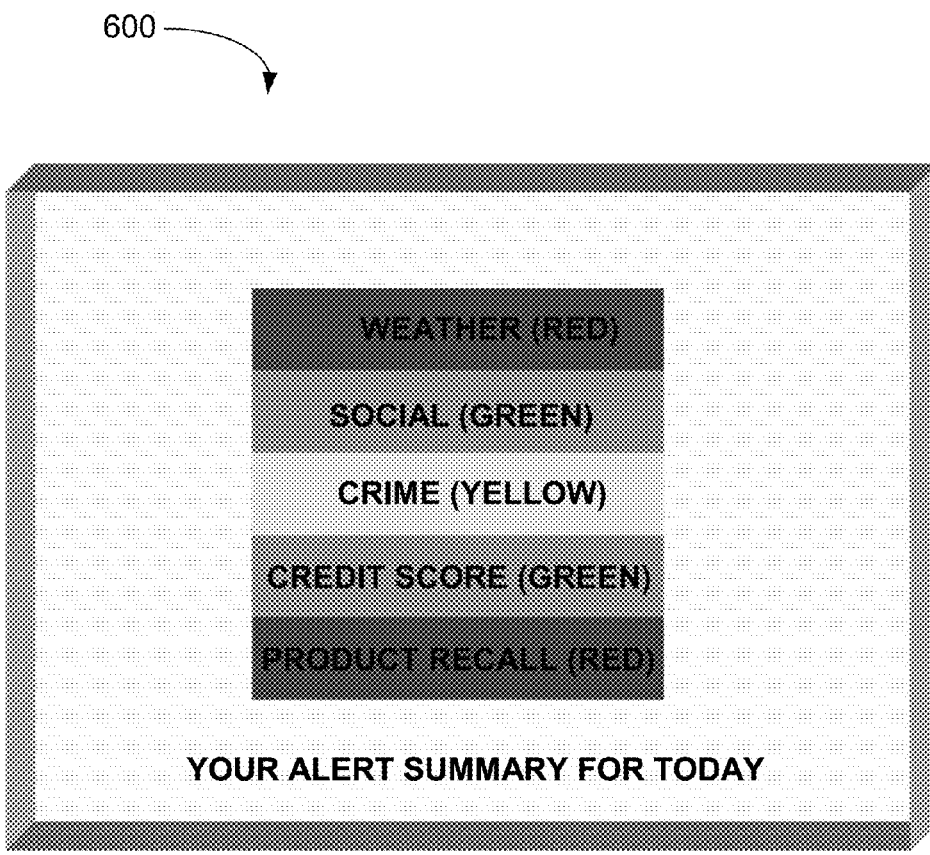
FIG. 6 shows an example color-coded alerts display screen of a user device in accordance with at least one aspect of the present disclosure.

FIG. 6 shows an example color-coded alerts display screen 600 of a user device in accordance with at least one aspect of the present disclosure. The display screen 600 includes various categories (e.g., weather, social, crime, credit score, product recall, etc.) for which a given user has received alerts. Each category is color-coded in a red, yellow, or green format to indicate to the user the alert severity level for each category. For instance, as shown in FIG. 6, the weather and product recall categories have been coded red, indicating an urgent alert level for these categories (e.g., snow storm in your area, car has faulty brakes, etc.), the crime category has been coded yellow, indicating a moderate alert level for this category (e.g., burglar on the loose in your general area but no specific information available), and the social and credit score categories have been coded green, indicating a low alert level for this category (e.g., child's FACEBOOK® friends appear normal, your credit score is doing well, etc.). In this way, a user may quickly and easily determine the alert status for each category during a predetermine time period (e.g., daily, monthly, hourly, weekly, yearly, etc.). In addition, by selecting one of the categories, a user may determine more information about considerations that may have gone into generating a particular color status.

As an example, consider a scenario where a user profile associated with a user indicates that alerts related to a snow storms and hail are deemed very helpful and those related to rain showers are not very helpful. Suppose that the enhanced alerts server 101 receives information from a weather station that weather local to the area in which the user lives on a given day calls for a major snowstorm. In this example, the enhanced alerts server 101 may match the user preferences with the weather alert. Because the feedback in this case indicates that alerts about snowstorms are considered useful, the enhanced alerts server 101 may distribute the alert to a mobile phone (e.g., text message) owned by the user. In this example, the snow storm alert may appear on the mobile phone display as a red bar, blinking every 1-2 seconds so that the user may realize that this alert is an important one.

Now, suppose that a few weeks later, the weather in the area local to the same user calls for rain showers. Because the user has previously indicated that alerts about rain showers are not considered important, enhanced alerts server 101 may take one of several possible actions. As a first possibility, the enhanced alerts server 101 may decide not to transmit the alert to the user, given the prior feedback. Alternatively, the enhanced alerts server 101 may decide to send the alert as a low priority email message. In this case, the alert may appear as a yellow bar on a laptop screen used by the user.

Now suppose that the enhanced alerts server 101 receives information regarding the child of the user discussed above in relation to the weather alerts. Suppose that this information relates to suspicious activity on the child's FACEBOOK® account. Suppose also that the user's profile does not have an indication on how important these types of alerts are to the user. Because the enhanced alerts server 101 does not have this information, the server 101 may use its processor and determine that this alert type should be sent to the user. This determination may be based on several factors; in this case, assume that the determination was based on the fact that the user profile indicates that the user is a single parent with two young children. While this information does not conclusively indicate that the user would like to receive alerts related to a child's social network, the enhanced alerts server 101 may determine that the user profile matches the profile of someone who would benefit from this information. Therefore, server 101 may transmit this alert as a high priority alert to the user's mobile phone. The alert may be displayed on the mobile phone with a social network avatar (e.g., a cartoon of a mother with her child, etc.) that blinks every 2 seconds.

An example of aspects involves a computer-assisted method comprising: receiving a first set of data from a plurality of alert-related data sources; generating a plurality of alerts from the first set of data; storing the plurality of alerts into a datastore associated with the computer; receiving a second set of data about a plurality of users; storing the second set of data into the datastore associated with the computer; applying, by a processor associated with the computer, an algorithm comprising a plurality of predefined rules for associating at least one of the plurality of alerts with at least one of the plurality of users and for generating at least one personalized alert for the at least one of the plurality of users, wherein at least one of the predefined rules relate to feedback provided by the at least one of the plurality of users regarding the plurality of alerts; storing the at least one personalized alert in the datastore associated with the computer; and transmitting the at least one personalized alert to the at least one of the plurality of users.

A further example of aspects involves an apparatus comprising: a processor; and a memory configured to store computer-readable instructions that, when executed by the processor, cause the processor to perform a method comprising: receiving a first set of data from a plurality of alert-related data sources; transforming and modifying a plurality of alerts from the first set of data; storing the plurality of alerts into a datastore; receiving a second set of data about a plurality of users; storing the second set of data into the datastore; applying an algorithm comprising a plurality of predefined rules for associating at least one of the plurality of alerts with at least one of the plurality of users and for generating at least one personalized alert for the at least one of the plurality of users, wherein at least one of the predefined rules relate to feedback provided by the at least one of the plurality of users regarding the plurality of alerts; storing the at least one personalized alert in the datastore; and transmitting the at least one personalized alert to the at least one of the plurality of users.

A further example of aspects involves a computer-readable storage medium having computer-executable program instructions stored thereon that when executed by a processor, cause the processor to perform steps comprising: receiving a first set of data from a plurality of alert-related data sources; transforming and modifying a plurality of alerts from the first set of data; storing the plurality of alerts into a datastore; receiving a second set of data about a plurality of users; storing the second set of data into the datastore; applying an algorithm comprising a plurality of predefined rules for associating at least one of the plurality of alerts with at least one of the plurality of users and for generating at least one personalized alert for the at least one of the plurality of users, wherein at least one of the predefined rules relate to feedback provided by the at least one of the plurality of users regarding the plurality of alerts; storing the at least one personalized alert in the datastore; and transmitting the at least one personalized alert to the at least one of the plurality of users.

A further example of aspects involves a method comprising: generating, using a processor associated with an enhanced alerts server, a user profile identifying an alert category and feedback data indicating a first alert type within the alert category for which alerts can be sent and a second alert type within the alert category for which alerts are prevented from being sent; receiving, at the enhanced alerts server, alert data from at least one information source; generating, using the processor, an alert message including the alert data in response to determining that the alert data contains information for the alert category, that the alert data is of the first alert type, and that the alert data corresponds to at least one of (1) a geographic location associated with the user profile or mobile phone geo location and (2) social information on a particular person; and causing transmission, to a user device, of the alert message including the alert data in response to the determining.

Further examples of aspects involve (a) an alert message including information on multiple alert categories including weather, social networks, and crime.

Further examples of aspects involve (b) information including assigning a color for each alert category and instructing the user device to display the color.

Further examples of aspects involve (c) information including assigning an avatar for each alert category and instructing the user device to display the avatar.

Further examples of aspects involve (d) information including assigning a blink frequency for each alert category and instructing the user device to assign the blink frequency to a displayed alert color or alert avatar.

Further examples of aspects involve (e) assigning an initial score to the alert data using a processor.

Further examples of aspects involve (f) adjusting the initial score upward or downward based on user feedback on previous similar alerts, using the processor.

Further examples of aspects involve (g) assigning predefined or user configurable actions that are related to the alert data using the processor.

Further examples of aspects involve (h) user-configurable actions including at least one action.

Further examples of aspects involve (i) comparing the adjusted score to a threshold to determine whether to cause transmission of the alert message, using the processor.

Further examples of aspects involve (j) estimating an alert risk severity in order to determine whether to override a user specified preference and cause transmission of the alert message, using the processor.

A further example of aspects involves a method comprising: receiving, at a user device, a first alert message corresponding to a first alert category, a first alert type with the first alert category, and an alert priority from a server, wherein the first alert category is chosen from the group consisting of: (1) identity theft, (2) product recalls, (3) social networks, and (4) a location of a user associated with the user device; displaying the first alert message on a display associated with the user device; transmitting feedback back to the server, wherein the feedback indicates how helpful the first alert message was to the user; and receiving a second alert message at the user device, wherein the second alert message takes into account the feedback provided by the user to modify the alert priority of the second alert message.

Further examples of aspects involve (a) a first alert message including information on multiple alert categories related to the user.

Further examples of aspects involve (b) information including assigning a color for each alert category and instructing the display to display the color.

Further examples of aspects involve (c) information including assigning an avatar for each alert category and instructing the display to display the avatar.

Further examples of aspects involve (d) information including assigning a predetermined blink frequency for each alert category based on an alert severity and instructing the display to intermittently display a color or avatar at the predetermined blink frequency.

Further examples of aspects involve (e) receiving a selection from the user to display more information related to one of the displayed colors.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps discussed herein may be performed in other than the recited order, and that one or more steps may be optional in accordance with aspects of the invention.

What is claimed is:

1. An apparatus comprising:
   at least one processor; and
   at least one memory storing computer-readable instructions that, when executed by the at least one processor, cause the apparatus at least to perform:
      receiving a first set of data from a plurality of alert-related data sources;
      generating a plurality of alerts from the first set of data;
      storing the plurality of alerts;
      receiving a second set of data about a plurality of users;
      storing the second set of data;
      applying an algorithm comprising a plurality of predefined rules for associating at least one of the plurality of alerts with at least one of the plurality of users and for generating at least one personalized alert for the at least one of the plurality of users,
         wherein at least one of the plurality of predefined rules relates to feedback provided by the at least one of the plurality of users regarding a type of alert to be transmitted to the at least one of the plurality of users and a type of alert to be prevented from transmission to the at least one of the plurality of users;
      storing the at least one personalized alert;
      determining a risk mitigating action related to the at least one personalized alert;
      transmitting, to the at least one of the plurality of users, the at least one personalized alert with a recommendation to perform the risk mitigating action and an offer for a discount on an insurance premium under a condition that the risk mitigating action is performed; and
      receiving, from an electronic device, performance data indicating that the risk mitigating action has been performed; and
      verifying that the risk mitigating action has been performed based on the performance data.

2. The apparatus of claim 1, wherein the first set of data relates to information selected from the group consisting of: weather, social networks, and crime.

3. The apparatus of claim 1, wherein the processor further performs: assigning the at least one personalized alert an alert priority.

4. A method comprising:
   generating, using a processor associated with an enhanced alerts server, a user profile identifying an alert category and feedback data indicating a first alert type within the alert category for which alerts can be sent and a second alert type within the alert category for which alerts are prevented from being sent;
   receiving, at the enhanced alerts server, alert data from at least one information source;
   determining a risk mitigating action based on the alert data;
   in response to determining that the alert data contains information for the alert category and that the alert data is of the first alert type, generating, using the processor, an alert message, including: the alert data, a recommendation to perform the risk mitigating action, and an offer for a discount on an insurance premium under a condition that the risk mitigating action is performed;
   causing transmission of the alert message in response to the generating;
   receiving, at the enhanced alerts server from an electronic device, performance data indicating that the risk mitigating action has been performed; and
   verifying that the risk mitigating action has been performed based on the performance data.

5. The method of claim 4,
   wherein the alert message further includes information on multiple alert categories including weather, social networks, and crime, and
   wherein the method further comprises assigning a color to a particular alert category of the alert categories based on severity of the alert data and instructing a user device to display the color for the particular alert category when presenting the particular alert category, wherein the severity is dependent at least on time sensitivity of the alert data.

6. The method of claim 5, further comprising:
   assigning an avatar for each of the alert categories and instructing a user device to display the avatar; and assigning a blink frequency for each of the alert categories and instructing a user device to assign the blink frequency to a displayed alert color or alert avatar.

7. The method of claim 4, further comprising:
at the processor, assigning an initial score to the alert data based the user profile, wherein the initial score indicates how relevant the alert data is to a user associated with the user profile;
using the processor, adjusting the initial score upward or downward based on user feedback on previous similar alerts to obtain an adjusted score, wherein the user feedback indicates whether or not the previous similar alerts were helpful or unhelpful; and
using the processor, comparing the adjusted score to a threshold to determine whether to cause transmission of the alert message.

8. The method of claim 4, further comprising: using the processor, assigning predefined or user configurable actions that are related to the alert data.

9. The method of claim 4, further comprising: using the processor, estimating an alert risk severity and determining whether to override a user specified preference and cause transmission of the alert message.

10. A method comprising:
receiving, at a user device, a first alert message from a server along with a recommendation to perform a risk mitigating action and an offer for a discount on an insurance premium under a condition that the risk mitigating action is performed, wherein the first alert message is associated with a first alert category, a first alert type within the first alert category, and a first alert priority, and wherein the risk mitigating action is related to the first alert category;
displaying the first alert message, the recommendation, and the offer on a display associated with the user device;
transmitting, via a communication module associated with the user device, feedback back to the server, wherein the feedback indicates how helpful the first alert message was to a user;
transmitting, via the communication module, performance data indicating that the risk mitigating action has been performed; and
receiving a second alert message at the user device, the second alert message corresponding to the first alert category and having a second alert priority different from the first alert priority, wherein the second alert priority of the second alert message is determined based at least in part on the feedback transmitted back to the server.

11. The method of claim 10, wherein the first alert message includes information on multiple alert categories related to the user.

12. The method of claim 10, further comprising:
analyzing time sensitivity and type of risk represented by information in the first alert message; and
setting the first alert priority based on the analyzing the time sensitivity and the type of risk.

13. The method of claim 10, further comprising:
analyzing language used in publicly available Internet forums; and
setting the first alert priority based on the analyzing the language.

14. The method of claim 12, further comprising:
setting the first alert priority to a highest value when the information in the first alert message relates to at least one of violence, physical or emotional harassment, and sexual activity.

15. The method claim 10, wherein the first alert message further includes an initial score that is configured to be modified based on the feedback.

16. The apparatus of claim 1, further including additional computer-readable instructions that, when executed by the at least one processor, further cause the apparatus to perform:
determining a type of alert associated with the at least one personalized alert;
determining, based on the determined type of alert, a communication protocol associated with the determined type of alert; and
determining, based on the determined type of alert, whether to assess a fee for transmitting the at least one personalized alert based,
wherein the at least one personalized alert is transmitted via the determined communication protocol.

17. The apparatus of claim 1, wherein the verifying that the risk mitigating action has been performed comprises verifying that a vehicle has been moved to a specific area based on global positioning system (GPS) coordinates associated with the vehicle.

18. The apparatus of claim 17,
wherein the electronic device comprises a GPS receiver;
wherein the performance data comprises the GPS coordinates and a time stamp; and
wherein the verifying that the vehicle has been moved to the specific area comprises verifying, based on the time stamp, that the vehicle has been moved to the specific area after transmission of the at least one personalized alert and before an event associated with the at least one personalized alert.

19. The apparatus of claim 1, wherein the applying the algorithm comprises matching a first profile of a first user among the plurality of users with a second profile of a second user among the plurality of users to generate the at least one personalized alert.

20. The apparatus of claim 1, wherein the applying the algorithm comprises associating the at least one of the plurality of alerts with the at least one of the plurality of users based on a determination that a profile of the at least one of the plurality of users matches a profile of another user associated with the at least one of the plurality of alerts.

* * * * *